US008230141B2

(12) United States Patent
Zimmermann

(10) Patent No.: US 8,230,141 B2
(45) Date of Patent: Jul. 24, 2012

(54) APPARATUS AND METHOD FOR SORTING ITEMS

(75) Inventor: Armin Zimmermann, Constance (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/947,261

(22) Filed: Nov. 16, 2010

(65) Prior Publication Data

US 2011/0119414 A1 May 19, 2011

(30) Foreign Application Priority Data

Nov. 16, 2009 (DE) ........................ 10 2009 053 051

(51) Int. Cl.
*G06F 3/00* (2006.01)
*B07C 5/00* (2006.01)

(52) U.S. Cl. ........................................ 710/53; 209/583

(58) Field of Classification Search .................... 710/53
See application file for complete search history.

(56) References Cited

U.S. PATENT DOCUMENTS

| | | | | |
|---|---|---|---|---|
| 3,300,066 | A | 1/1967 | Henig et al. | |
| 3,573,748 | A | 4/1971 | Holme | |
| 5,096,090 | A * | 3/1992 | Schwartz et al. | 221/125 |
| 5,186,336 | A * | 2/1993 | Pippin et al. | 209/583 |
| 5,421,464 | A * | 6/1995 | Gillmann et al. | 209/584 |
| 6,126,017 | A | 10/2000 | Hours | |
| 6,793,063 | B1 | 9/2004 | Gillet et al. | |
| 7,159,722 | B2 | 1/2007 | Berdelle-Hilge | |
| 7,397,010 | B2 | 7/2008 | Wilke | |
| 7,683,284 | B2 | 3/2010 | Haselberger et al. | |
| 2004/0186616 | A1 | 9/2004 | Overman et al. | |
| 2004/0261366 | A1 | 12/2004 | Gillet et al. | |
| 2005/0056577 | A1 | 3/2005 | Berdelle-Hilge | |
| 2006/0259185 | A1 | 11/2006 | Berdelle-Hilge | |
| 2007/0090027 | A1 * | 4/2007 | Haselberger et al. | 209/584 |
| 2007/0226156 | A1 * | 9/2007 | De Leo et al. | 705/406 |
| 2008/0060981 | A1 | 3/2008 | Skrdlant et al. | |
| 2009/0050541 | A1 * | 2/2009 | Berdelle-Hilge | 209/584 |
| 2009/0060698 | A1 | 3/2009 | Enenkel | |

FOREIGN PATENT DOCUMENTS

| | | | |
|---|---|---|---|
| DE | 10305487 | B3 | 8/2004 |
| DE | 102004033564 | B3 | 3/2006 |
| DE | 102006025601 | B3 | 9/2007 |
| DE | 102006041253 | A1 | 3/2008 |
| EP | 0761322 | A1 | 3/1997 |

* cited by examiner

*Primary Examiner* — Henry Tsai
*Assistant Examiner* — Titus Wong
(74) *Attorney, Agent, or Firm* — Laurence A. Greenberg; Werner H. Stemer; Ralph E. Locher

(57) ABSTRACT

An apparatus for sorting items has a buffer device with a multiplicity of buffer storage locations, filled by a loading device, and an intermediate store with a multiplicity of intermediate storage locations. The intermediate store and the buffer device are arranged such that items stored at a buffer storage location can be transferred into an intermediate storage location. The intermediate storage locations are movable at a relative speed with respect to the buffer storage locations and are suitable for receiving more than one item, for presorting. The buffer device is arranged over the intermediate store such that an item located in a buffer storage location can fall into an intermediate storage location. The apparatus has a multiplicity of collecting containers, arranged under the intermediate store, and are at rest during the sorting operation and are filled during the sorting operation with items contained in the intermediate storage locations.

8 Claims, 5 Drawing Sheets

APPARATUS AND METHOD FOR SORTING ITEMS

CROSS-REFERENCE TO RELATED APPLICATION

This application claims the priority, under 35 U.S.C. §119, of German application DE 10 2009 053 051.7, filed Nov. 16, 2009; the prior application is herewith incorporated by reference in its entirety.

BACKGROUND OF THE INVENTION

Field of the Invention

The invention relates to an apparatus for sorting items having a buffer device with a multiplicity of buffer storage locations, which can be filled by a loading device, and an intermediate store with a multiplicity of intermediate storage locations. The intermediate store and the buffer device are arranged in such a way that items which are stored at a buffer storage location of the buffer device can be transferred into an intermediate storage location of the intermediate store. The intermediate storage locations of the intermediate store being movable at a relative speed with respect to the buffer storage locations of the buffer device and suitable for receiving more than one item in each case, for the purpose of a presorting. The buffer device is arranged at least in certain portions over the intermediate store.

An apparatus of this type is known from published, non-prosecuted German patent application DE 10 2006 041 253 A1, corresponding to U.S. patent publication No. 20080060981. The apparatus serves for sorting items and has a buffer device for buffering large letters. The buffer device contains stacking locations, which circulate in a manner similar to a carousel with the aid of a transporting belt. Connected to the buffer device is an intermediate store, the intermediate storage locations of which are referred to as so-called end stations. These end stations are filled with large letters and normal letters. As soon as an end station has reached a device for emptying the end stations that is arranged at the end of the sorting system, the letters and large letters that are located in the end station are removed there by a device. With the aid of this device, all the end stations are emptied one after the other, so that the sorting of the letters and large letters that is predetermined by the sequence of the end stations is retained.

U.S. patent publication No. 2006/0259185 A1 discloses an apparatus for sorting items which has a buffer device and an intermediate store. Items are transferred from the buffer device into the intermediate store and fall from there onto a transporting belt, which subsequently transports the items further in a horizontal direction.

U.S. patent publication No. 2004/0186616 A1 discloses an apparatus for handling documents in which movable platforms are used. The platforms serve for buffering the documents and are moved in a vertical direction.

German patent DE 10 2006 025 601 B3 describes an apparatus with a movable buffer device, which is arranged above an intermediate store with fixed intermediate storage locations. The intermediate storage locations are not movable. Arranged below the immovable intermediate storage locations is a container path, on which collecting containers are moved in relation to the fixed intermediate storage locations.

European patent EP 0 761 322 B1, corresponding to U.S. Pat. No. 6,126,017, discloses an apparatus with buffer containers, which are provided at each sorting output of the apparatus, in order to store sorted articles temporarily and to transfer these articles when called into the corresponding sorting output container that is assigned to the sorting output. The apparatus is equipped with a monitoring device, which monitors a filling level of the sorting output containers and the filling level of the buffer containers and decides on the basis of this information the opening or closing of a hinged bottom of the buffer containers.

German patent DE 10 2004 033 564 B3, corresponding to U.S. Pat. No. 7,683,284, discloses an apparatus for sorting items, with a fixedly mounted intermediate store and movable collecting containers, which can be filled from the intermediate store.

German patent DE 103 05 847 B3, corresponding to U.S. Pat. No. 7,397,010, describes an apparatus for sorting items in which the transporting speeds of consignment buffer stores and consignment containers as well as the lengths of transfer sections are fixed such that, in the time period in which a storage pocket runs through a transfer section of a consignment buffer store, each consignment container moves through under the storage pocket.

U.S. Pat. No. 7,159,722 describes a kind of paternoster system for sorting items.

U.S. patent publication No. 2004/0261366 A1 discloses a sorting apparatus in which large and small letters are separated and subsequently introduced into containers in a sequence that corresponds to the mailman's delivery points.

U.S. Pat. No. 6,793,063 describes an apparatus with storage loops for sorting items.

Further apparatuses for sorting items are known from the U.S. patent publication Nos. 2009/0060698 A1 and 2009/0050541 A1.

SUMMARY OF THE INVENTION

It is accordingly an object of the invention to provide an apparatus and a method for sorting items which overcome the above-mentioned disadvantages of the prior art methods and devices of this general type, which is a particularly space-saving apparatus for sorting items.

With the foregoing and other objects in view there is provided, in accordance with the invention an apparatus for sorting items. The apparatus contains a loading device, a buffer device with a multiplicity of buffer storage locations, which can be filled by the loading device, and an intermediate store with a multiplicity of intermediate storage locations. The intermediate store and the buffer device are disposed such that the items stored at a buffer storage location of the buffer device can be transferred into an intermediate storage location of the intermediate store. The intermediate storage locations of the intermediate store are movable at a relative speed with respect to the buffer storage locations of the buffer device and suitable for receiving more than one item in each case, for a purpose of presorting. The buffer device is disposed at least in certain portions over the intermediate store, the buffer device disposed over the intermediate store such that an item disposed in the buffer storage location can fall into the intermediate storage location. A multiplicity of collecting containers are disposed under the intermediate store and are at rest during a sorting operation and can be filled during the sorting operation with the items contained in the intermediate storage locations of the intermediate store. The collecting containers at rest are disposed under the intermediate store such that an assignment of the items to individual ones of the collecting containers at rest takes place by a movement of the intermediate storage locations, and the items that are located in the intermediate storage location can be dropped into one of the collecting containers at rest as soon as a respective intermediate storage location is suitably positioned.

It is accordingly provided by the invention that the buffer device is disposed over the intermediate store in such a way that an item located in a buffer storage location can fall into an intermediate storage location. The apparatus has a multiplicity of collecting containers, which are arranged under the intermediate store, are at rest during the sorting operation and can be filled during the sorting operation with items contained in the intermediate storage locations of the intermediate store. The collecting containers at rest are arranged under the intermediate store in such a way that an assignment of the items to the individual collecting containers at rest takes place by the movement of the intermediate storage locations. The item or items that are located in an intermediate storage location can be dropped into one of the collecting containers at rest as soon as the respective intermediate storage location is suitably positioned.

A major advantage of the apparatus according to the invention is the possibility of presorting already in the same plane as the intermediate storage, whereby the apparatus can be of a very compact construction.

A further major advantage of the apparatus according to the invention can be seen in that faster passage through the process can be achieved on account of the presorting possibility, whereby a cost reduction can be obtained with regard to the sorting operation.

A further major advantage of the apparatus according to the invention is that it is possible on account of the possibility of presorting the items in the intermediate store to use collecting containers which are at rest or at a standstill during the sorting operation and are filled during the sorting operation with items contained in the intermediate storage locations of the intermediate store in a state of rest.

The items to be sorted may be, for example, flat items, for example letters or packages or the like.

It is regarded as advantageous if the apparatus has a further loading device, which is connected to the intermediate store and can load the intermediate storage locations. The filling of the intermediate store by the further loading device preferably takes place in a horizontal direction and the filling of the intermediate store by the buffer device preferably takes place in a vertical direction. Such a further loading device makes a higher throughput possible during the sorting operation.

In addition, it is regarded as advantageous if the bottom surface of the collecting containers at rest under the intermediate store is inclined with respect to the horizontal and at least one side wall of the collecting containers at rest under the intermediate store is inclined with respect to the vertical.

The speed of the buffer storage locations may be greater or less than that of the intermediate storage locations; however, it is preferably greater, in particular whenever the intermediate storage locations are still being filled by a further loading device.

The direction of movement of the buffer storage locations may correspond or be opposite to the direction of movement of the intermediate storage locations. With a view to the sorting speed, however, an opposite direction of movement is regarded as advantageous.

In order to increase the throughput still further, it is regarded as advantageous if the further loading device is suitable for setting transporting paths of different lengths within the further loading device for the items to be fed into the intermediate store. This makes further degrees of freedom possible for the presorting in the intermediate store, because the feeding of the items into the intermediate store can take place at the optimum point in time in each case.

Transporting paths of different lengths can be realized particularly simply, and consequently advantageously, if the further loading device has waiting loops for the items to be fed into the intermediate store. The further loading device is preferably configured in such a way that it buffers items in waiting loops until the most favorable time in each case for feeding into the intermediate store is reached.

The further loading device is preferably a sandwich belt system. For reasons of space, such a sandwich belt system is preferably arranged in such a way that the filling direction of the items into the intermediate store is perpendicular, at least substantially perpendicular, to the filling direction with which the items are fed by the buffer device into the intermediate store.

The filling of the intermediate store by the further loading device preferably takes place in a horizontal direction—at least approximately in a horizontal direction—and the filling of the intermediate store by the buffer device preferably takes place in a vertical direction—at least approximately in a vertical direction.

The first loading device and the further loading device are preferably configured for items of different sizes. The first loading device is preferably configured for the loading of items that are larger than a predetermined minimum size (for example large letters), and the further loading device is preferably configured for the loading of items that are smaller than a predetermined minimum size (for example standard letters).

Collecting containers for receiving the items coming from the intermediate store preferably have a bottom surface which is inclined with respect to the horizontal. At least one side wall of the collecting containers is preferably inclined with respect to the vertical.

The collecting containers are preferably provided on the bottom of the container with additional means operating with frictional and/or interlocking engagement, which support and/or hold the items in the collecting container. The additional means may be formed, for example, by a fluting and/or rubber coating, which prevents the items from slipping out of place on the bottom of the container.

The invention also relates to a method for sorting items in which at least two buffer storage locations of a buffer device are each filled with an item and the items are transferred one after the other into an intermediate store and intermediate storage locations of the intermediate store are moved at a relative speed with respect to the buffer storage locations of the buffer device and a presorting takes place, in which one or more items coming from the buffer device are dropped into the same intermediate storage location of the intermediate store.

With respect to such a method, it is provided according to the invention that a multiplicity of collecting containers at rest during the sorting operation are filled during the sorting operation with items contained in the intermediate storage locations of the intermediate store, by the intermediate storage locations being positioned over the collecting containers at rest and the item or items that are located in the intermediate storage locations respectively being dropped into a collecting container at rest under the respective intermediate storage location.

With respect to the advantages of the method according to the invention, reference should be made to the advantages of the apparatus described above, since the advantages of the method according to the invention substantially correspond to those of the apparatus according to the invention.

The invention also relates to an apparatus for sorting items, with a buffer device with a multiplicity of buffer storage locations, which can be filled by a loading device, and an intermediate store with a multiplicity of intermediate storage locations. The intermediate store and the buffer device are arranged in such a way that items which are stored at a buffer storage location of the buffer device can be transferred into an intermediate storage location of the intermediate store. The apparatus has a further loading device, which is connected to the intermediate store and can load the intermediate storage locations. In the case of this configuration, it may be provided, for example, that the intermediate storage locations of the intermediate store are at rest or at a standstill during the sorting operation and the collecting containers are moved during the sorting operation. Alternatively, it may be provided that the collecting containers are at rest or at a standstill during the sorting operation and the intermediate storage locations of the intermediate store are moved at a relative speed with respect to the buffer storage locations of the buffer device.

The invention additionally relates to an apparatus for sorting items, with a buffer device with a multiplicity of buffer storage locations, which can be filled by a loading device, and an intermediate store with a multiplicity of intermediate storage locations, the intermediate store and the buffer device being arranged in such a way that items which are stored at a buffer storage location of the buffer device can be transferred into an intermediate storage location of the intermediate store, and the apparatus having at least one collecting container which is at rest or at a standstill during the sorting operation and can be filled during the sorting operation with items contained in the intermediate storage locations of the intermediate store.

Furthermore, the invention relates to an apparatus for sorting items, with a buffer device with a multiplicity of buffer storage locations, which can be filled by a loading device, and an intermediate store with a multiplicity of intermediate storage locations. The intermediate store and the buffer device are arranged in such a way that items which are stored at a buffer storage location of the buffer device can be transferred into an intermediate storage location of the intermediate store. The invention is characterized in that the intermediate storage locations of the intermediate store can be moved at a relative speed with respect to the buffer storage locations of the buffer device and are suitable for receiving more than one item in each case, for the purpose of a presorting.

Other features which are considered as characteristic for the invention are set forth in the appended claims.

Although the invention is illustrated and described herein as embodied in an apparatus and a method for sorting items, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

For the sake of clarity, the same designations are always used in the figures for components that are identical or comparable.

Figure 1:
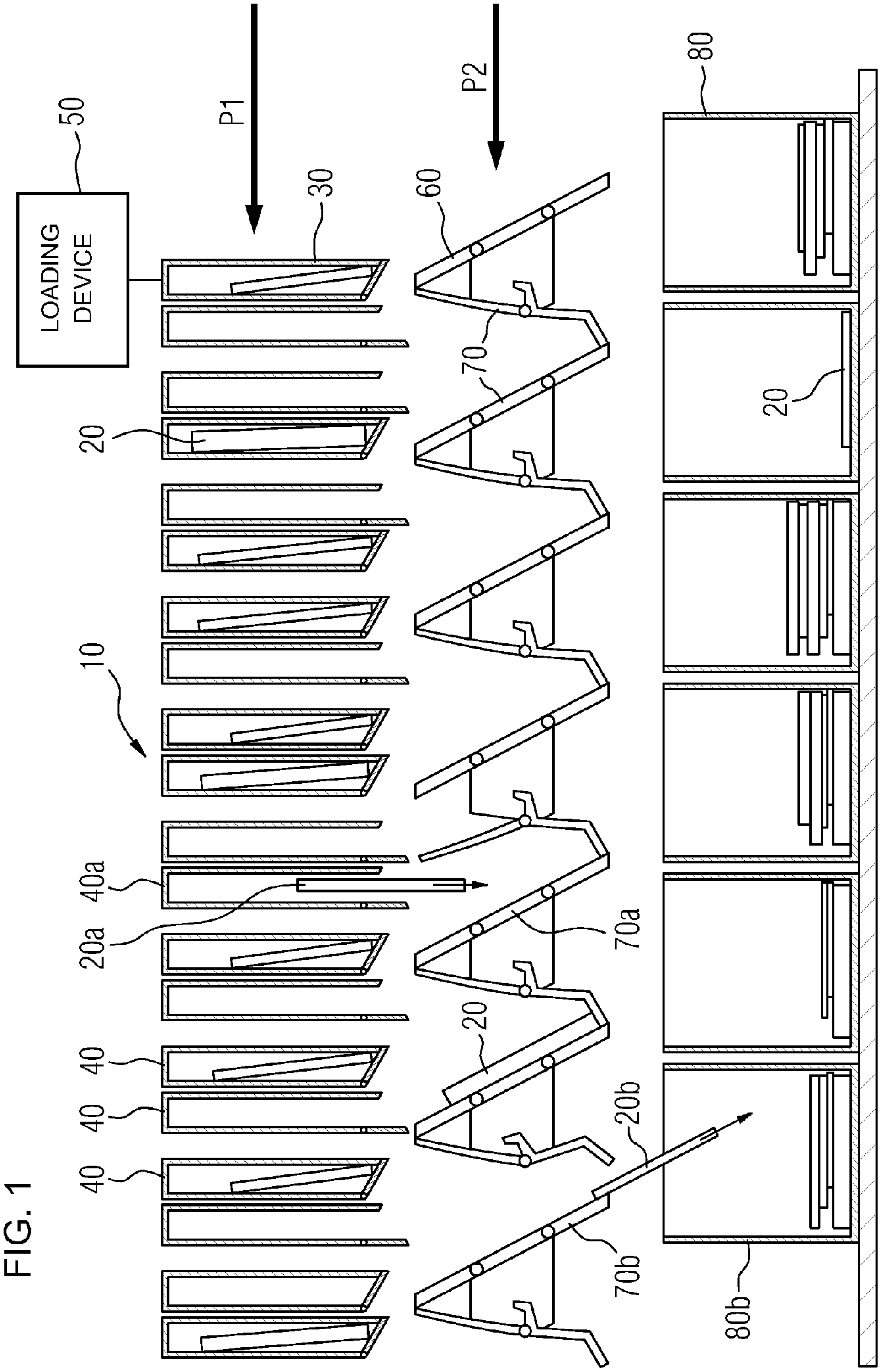
FIG. 1 is an illustration showing a first exemplary embodiment of an apparatus according to the invention, on a basis of which a sorting method according to the invention is also explained by way of example, the apparatus having collecting containers which are at rest or at a standstill during the sorting operation, and, as far as the apparatus is concerned, intermediate storage locations of an intermediate store being moved during the sorting at a relative speed with respect to the buffer storage locations of the buffer device.

Referring now to the figures of the drawing in detail and first, particularly, to FIG. 1 thereof, there is shown an apparatus 10 for sorting preferably flat items 20 can be seen. The flat items 20 may be, for example, standard letters and/or large letters.

The apparatus 10 is equipped with a buffer device 30, which may be formed, for example, by a ring of pockets or clamps. The buffer device 30 has a multiplicity of buffer storage locations 40, which are suitable for holding and/or carrying the items 20 by pockets, clamps or other devices. The buffer storage locations 40 can be filled by a loading device 50, which in FIG. 1 is only schematically represented by a block.

The apparatus 10 is additionally equipped with an intermediate store 60 with a multiplicity of intermediate storage locations 70. The intermediate store 60 may be formed, for example, by a transfer container carousel, which has transfer containers as intermediate storage locations 70.

The intermediate store 60 interacts with the buffer device 30 in such a way that the items 20 that are held at a buffer storage location 40 can be transferred into one of the intermediate storage locations 70 of the intermediate store 60.

The intermediate storage locations 70 of the intermediate store 60 may be moved during the sorting of the items at a relative speed with respect to the buffer storage locations 40 of the buffer device 30. In other words, in the case of the exemplary embodiment according to FIG. 1, the intermediate storage locations 70 are not fixed in place but movable. Furthermore, the intermediate storage locations 70 are suitable for receiving one or more of the items 20 for the purpose of a presorting.

Additionally represented in FIG. 1 are collecting containers 80, which are at a standstill during the sorting operation, that is to say do not have to be moved for the sorting.

It goes without saying that the collecting containers 80 do not have to be fixed in place; rather, they are preferably movable, in order that they can be separated from the apparatus 10 after filling, in order for the items located therein to be transported further.

The apparatus 10 according to FIG. 1 may, for example, be operated as now described.

The buffer device 30 is loaded with flat items 20 by the loading device 50. The buffer storage locations 40 are preferably thereby loaded with a maximum of one item 20 each. Alternatively, however, a presorting is also possible at this location, by one or more of the buffer storage locations 40 being loaded with two or more items.

The buffer storage locations 40 of the buffer device are moved from the right to the left in FIG. 1, along the direction of arrow P1. The intermediate storage locations 70 of the intermediate store 60 are also moved in a corresponding way, but at a different speed, as indicated by a second arrow with the designation P2.

The speed of the buffer storage locations 40 of the buffer device 30 differs from that of the intermediate storage locations 70 of the intermediate store 60, in order that a relative speed and a relative displacement of the buffer storage locations 40 occurs in relation to the intermediate storage locations 70. As soon as a buffer storage location 40*a* is located over a matching intermediate storage location 70*a*, the buffer storage location 40*a* is opened, so that the item 20*a* that is located therein can, for example, fall into the intermediate storage location 70*a*.

In the case of the exemplary embodiment according to FIG. 1, the intermediate storage locations 70 of the intermediate store 60 are preferably suitable for receiving a number of items 20, in order to be able to perform a presorting already in the same plane as the intermediate storage.

Alternatively, the intermediate storage locations 70 of the intermediate store 60 may also be suitable only for receiving a single item 20; in this case, the sorting takes place during the transfer of the items 20 into the collecting containers 80 and/or during the transfer of the items 20 from the loading device 50 into the buffer device 30.

In the case of the exemplary embodiment according to FIG. 1, the collecting containers 80 do not have to be moved during the sorting; this is so since an assignment of the items 20 to the individual collecting containers 80 may take place by the movement of the intermediate storage locations 70 along the direction of the arrow P2. In FIG. 1 there is shown by way of example an item 20*b*, which is dropped from the intermediate storage location 70*b* into the collecting container 80*b* as soon as the intermediate storage location 70*b* is suitably positioned.

Figure 2:
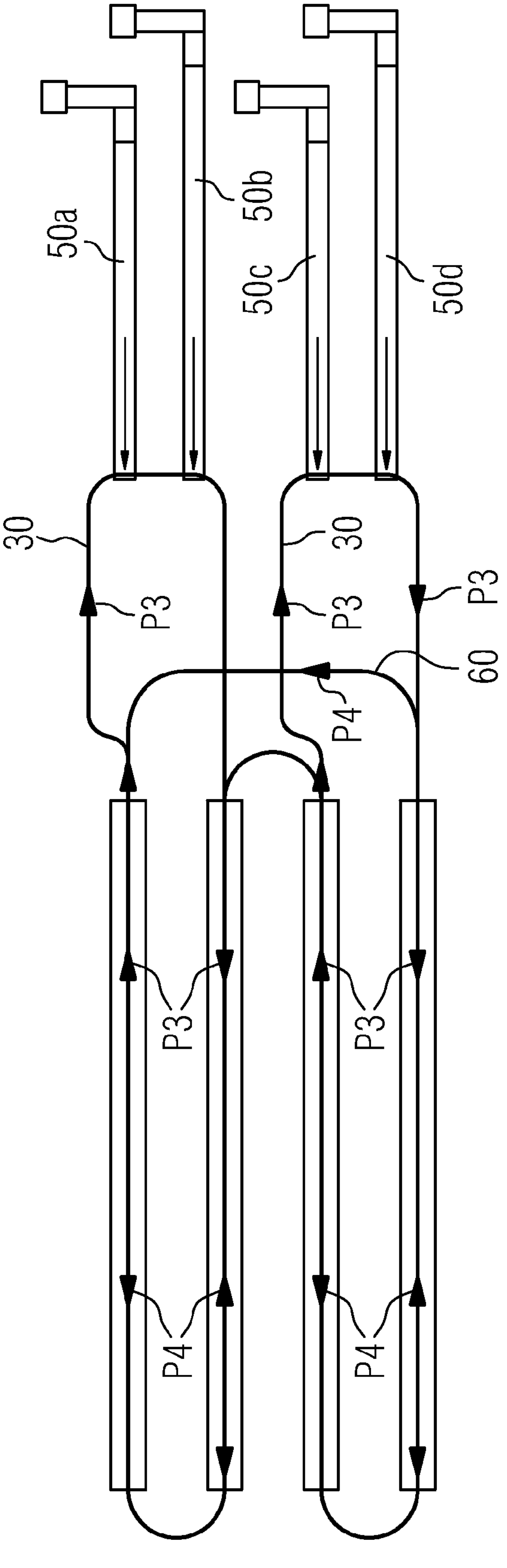
FIG. 2 is a schematic representation an exemplary embodiment of how in the case of the apparatus according to FIG. 1 the buffer device can be loaded by four separate loading devices.

FIG. 2 shows in a schematic representation a variant of the exemplary embodiment according to FIG. 1. In the case of this exemplary embodiment there are four separate loading devices 50*a*, 50*b*, 50*c* and 50*d*, which interact with the buffer device 30 and load the buffer storage locations with items.

The direction of movement of the buffer storage locations is respectively indicated in FIG. 2 by arrows P3. It can be seen that—as a difference from the exemplary embodiment according to FIG. 1—the direction of movement of the buffer storage locations in the case of the exemplary embodiment according to FIG. 2 is opposite to the direction of movement of the intermediate storage locations of the intermediate store 60. The direction of movement of the intermediate storage locations is respectively indicated in FIG. 2 by arrows P4.

Figure 3:
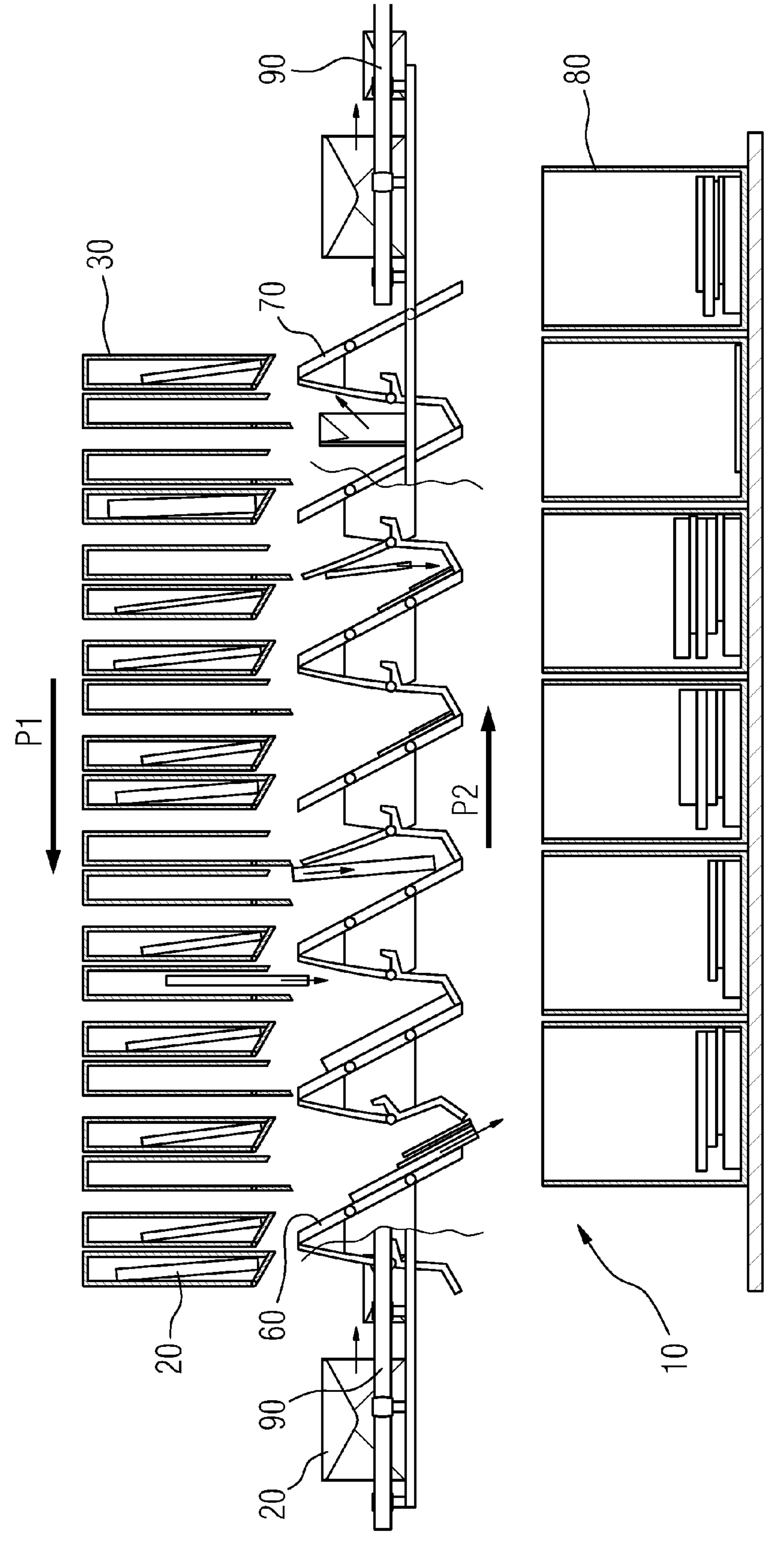
FIG. 3 is an illustration showing a second exemplary embodiment of an apparatus according to the invention in which—during a sorting operation—the intermediate store is loaded by the buffer device and by a further loading device, the collecting containers are at rest or at a standstill during the sorting operation and the intermediate storage locations of the intermediate store are moved at a relative speed with respect to the buffer storage locations of the buffer device.

FIG. 3 shows a further exemplary embodiment of the apparatus 10. In the case of this apparatus, connected to the intermediate store 60 is a further loading device 90, which, during the sorting, can load the intermediate storage locations 70 of the intermediate store 60 in a horizontal direction for example—that is to say perpendicularly to the plane of the page in FIG. 3—from the side. In the case of the exemplary embodiment according to FIG. 3, the intermediate storage locations 70 of the intermediate store 60 are therefore loaded with items 20 by the buffer device 30 in a vertical direction and by the further loading device 90 in a horizontal direction.

Preferably, large items, such as for example large letters, are supplied by the buffer device 30 and comparatively smaller items, such as for example standard letters, are supplied by the further loading device 90.

The further loading device 90 may, for example, be controllable with regard to its internal transporting paths in such a way that transporting paths of different lengths can be set for the items contained therein. Such a configuration makes it possible, for example, to produce for each of the items individual waiting or buffering times, in which they must remain within the further loading device 90 before they are fed into the intermediate storage locations 70 of the intermediate store 60. In this way, the optimum point in time for each item to be fed into the intermediate store can be respectively set. The further loading device may be formed, for example, by a sandwich belt system.

Also in the case of the exemplary embodiment according to FIG. 3, the collecting containers 80 are at rest during the sorting operation and are only moved, if at all, after they are completely filled with items. An assignment of the items 20 to the individual collecting containers 80 takes place by the movement of the intermediate storage locations 70 along the direction of the arrow P2.

Figure 4:
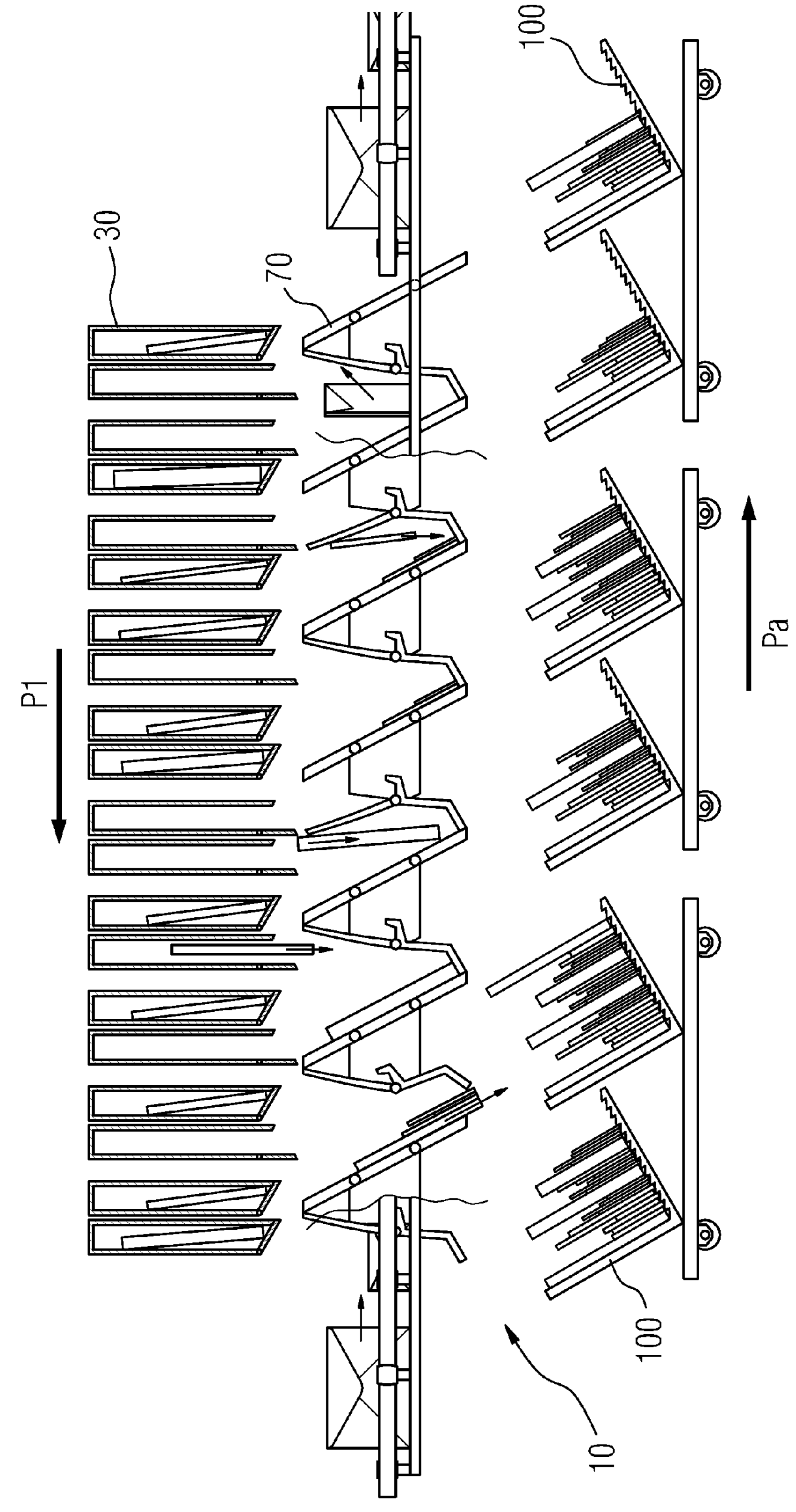
FIG. 4 is an illustration showing a third exemplary embodiment of an apparatus according to the invention in which—during a sorting operation—the intermediate store is loaded by the buffer device and by a further loading device, the intermediate storage locations of the intermediate store are at rest or at a standstill during the sorting operation and the collecting containers are moved.

In FIG. 4, a third exemplary embodiment of an apparatus 10 is represented. In the case of this exemplary embodiment, the intermediate storage locations 70 are loaded by the buffer device 30 and by the further loading device 90, but—as a difference from the exemplary embodiments according to FIGS. 1 to 3—they do not have to be moved during the sorting operation; rather, they may be at rest or at a standstill. In the case of the exemplary embodiment according to FIG. 4, an optional standstill of the intermediate storage locations 70 is made possible by movable collecting containers 100, which can be moved under the intermediate storage locations 70, for example along the direction of the arrow Pa, and consequently make it possible for items which are stored in intermediate storage locations 70 to be assigned to predetermined collecting containers 100.

It goes without saying that it is likewise possible in the case of the exemplary embodiment according to FIG. 4 for the intermediate storage locations 70 to be alternatively or additionally moved. Simultaneous moving of intermediate storage locations 70 and collecting containers 100 allows the sorting time to be shortened in an advantageous way.

Figure 5:
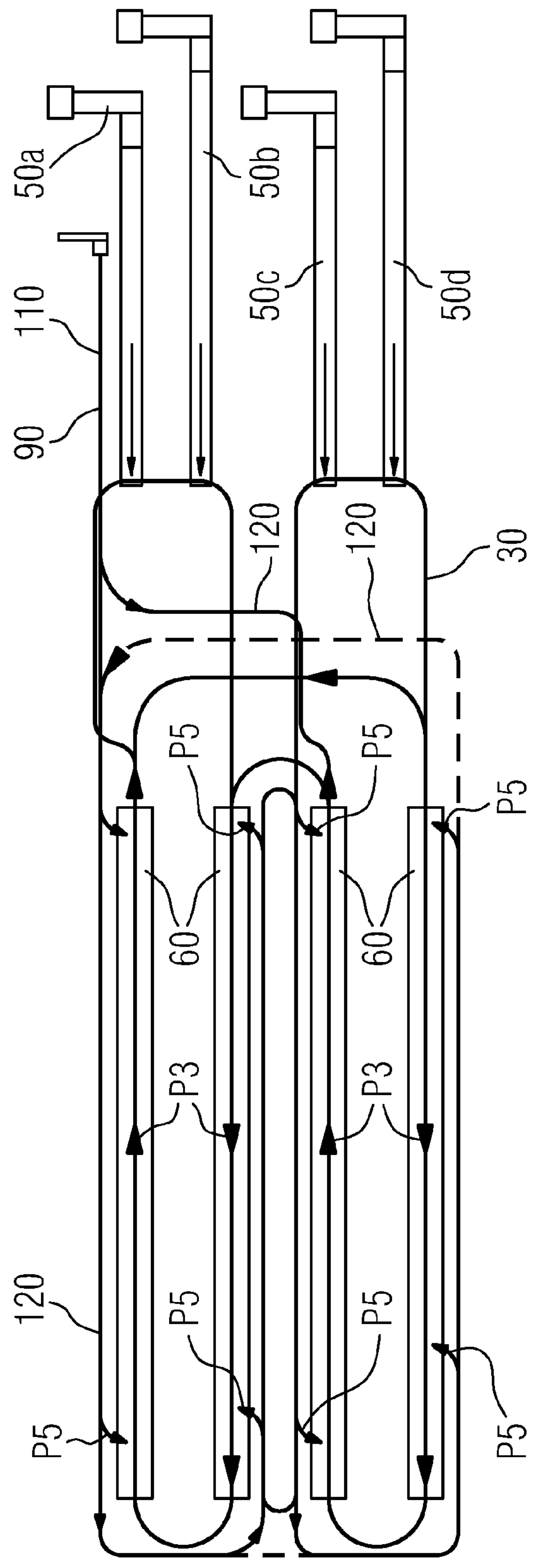
FIG. 5 is a schematic representation showing an exemplary embodiment of how in the case of the apparatus according to FIGS. 3 and 4 the buffer device can be loaded by four separate loading devices and the intermediate store can be loaded by a further loading device.

FIG. 5 shows in a schematic representation how in the case of the exemplary embodiment according to FIG. 3 or 4 a loading of the intermediate storage locations of the intermediate store 60 by the buffer device 30 and the further loading device 90 can take place. As in FIG. 2, the buffer device 30 is filled with items by four loading devices 50*a*, 50*b*, 50*c* and 50*d*; the further loading device 90 fills the intermediate storage locations of the intermediate store 60. The direction of movement of the buffer storage locations is respectively indicated in FIG. 5 by arrows P3; to this extent, FIG. 5 corresponds to FIG. 2.

In addition, it can be seen in FIG. 5 that the further loading device 90 may contain a sandwich belt system 110, which has one or more transporting strands 120, with which the items are transported in the further loading device 90 before they are fed into the intermediate storage locations of the intermediate store 60—preferably in a horizontal direction. The horizontal feeding is schematically indicated in FIG. 5 by arrows P5.

The invention claimed is:

1. An apparatus for sorting items, the apparatus comprising:

a loading device;

a buffer device with a multiplicity of buffer storage locations, said loading device for filling said buffer storage locations;

an intermediate store with a multiplicity of intermediate storage locations, said intermediate store and said buffer device disposed such that the items stored at a buffer storage location of said buffer device are transferable into an intermediate storage location of said intermediate store, said intermediate storage locations of said intermediate store being movable at a relative speed with respect to said buffer storage locations of said buffer device and suitable for receiving more than one item in each case, for a purpose of presorting;

said buffer device disposed at least in certain portions over said intermediate store, said buffer device disposed over said intermediate store for permitting an item disposed in said buffer storage location to fall into said intermediate storage location for filling said intermediate storage in a vertical direction;

a further loading device connected to said intermediate store for loading the items into said intermediate storage locations, said further loading device loading the items into said intermediate storage locations in a horizontal direction; and a multiplicity of collecting containers disposed under said intermediate store and being at rest during a sorting operation and for being filled during the sorting operation with the items contained in said intermediate storage locations of said intermediate store, said collecting containers at rest being disposed under said intermediate store such that an assignment of the items to individual ones of said collecting containers at rest takes place by a movement of said intermediate storage locations, and the items that are located in said intermediate storage location for being dropped into one of said collecting containers at rest as soon as a respective intermediate storage location is suitably positioned.

2. The apparatus according to claim 1, wherein said collecting containers each have a bottom surface at rest under said intermediate store and inclined with respect to a horizontal and at least one side wall at rest under said intermediate store and inclined with respect to a vertical.

3. The apparatus according to claim 1, wherein a speed of said buffer storage locations is greater than that of said intermediate storage locations.

4. The apparatus according to claim 1, wherein a direction of movement of said buffer storage locations is opposite to a direction of movement of said intermediate storage locations.

5. The apparatus according to claim 4, wherein said further loading device is suitable for setting transporting paths of different lengths within said further loading device for the items to be fed into said intermediate store.

6. The apparatus according to claim 4, wherein said loading device and said further loading device are configured for items of different sizes.

7. The apparatus according to claim 6, wherein:

said loading device is configured for a loading of items that are larger than a predetermined minimum size; and said further loading device is designed for a loading of items that are smaller than the predetermined minimum size.

8. A method for sorting items, which comprises the steps of:

filling at least two buffer storage locations of a buffer device with an item;

transferring the items one after another from the buffer storage locations in a vertical direction into intermediate storage locations of an intermediate store;

loading the intermediate storage locations with a further loading device connected to the intermediate store, the loading of the intermediate store with the further loading device taking place in a horizontal direction;

moving intermediate storage locations of the intermediate store at a relative speed with respect to the buffer storage locations of the buffer device and a presorting takes place, in which at least one of the items coming from the buffer device are dropped into a same intermediate storage location of the intermediate store; and filling a multiplicity of collecting containers at rest during the sorting operation during the sorting operation with items contained in the intermediate storage locations of the intermediate store, by the intermediate storage locations being positioned over the collecting containers at rest and the items that are disposed in the intermediate storage locations respectively being dropped into a collecting container at rest under a respective intermediate storage location.

* * * * *